United States Patent [19]

Kemp

[11] Patent Number: 5,030,263
[45] Date of Patent: Jul. 9, 1991

[54] MOTOR VEHICLE FILTER ELEMENT
[75] Inventor: Stanley W. Kemp, Hampshire, England
[73] Assignee: AC Rochester Overseas Corporation, Detroit, Mich.
[21] Appl. No.: 422,886
[22] Filed: Oct. 19, 1989
[30] Foreign Application Priority Data
  Oct. 20, 1988 [GB] United Kingdom ............... 8824611
[51] Int. Cl.⁵ ............................................. B01D 46/00
[52] U.S. Cl. ........................................ 55/477; 55/487; 55/498; 55/521; 264/DIG. 48; 264/252; 264/293; 162/117; 162/165
[58] Field of Search ................. 55/477, 487, 498, 521, 55/498; 210/493.1, 493.2; 264/DIG. 48, 293, 252, 286; 162/117, 165

[56]     References Cited
    U.S. PATENT DOCUMENTS
  2,782,933  2/1957  Monsarrat .......................... 55/477
  4,179,274 12/1979  Moon ........................... 55/DIG. 35
  4,303,426 12/1981  Battis ............................... 55/498

FOREIGN PATENT DOCUMENTS
  0094165  6/1988  European Pat. Off. .
  1197250  7/1970  United Kingdom .
  1197354  7/1970  United Kingdom .

Primary Examiner—Bernard Nozick
Attorney, Agent, or Firm—Gordon F. Belcher

[57]     ABSTRACT

A pleated paper filter element is disclosed which is formed from a mechanically-treated filter paper (10') which has the side thereof opposite to the wire-side (12) mechanically teased so as to form thereon an open, textured layer (18) of raised fibers. The starting material used is a standard, commercially-available filter paper which is resin-impregnated with an uncured phenolic resin. The pleated paper filter element formed from the treated filter paper (10') displays, after the element has been heated to cure the resin, a substantial increase of up to 73.5% in the dust-holding capacity over a like element formed from the standard, commercially-available filter paper.

4 Claims, 2 Drawing Sheets

MOTOR VEHICLE FILTER ELEMENT

TECHNICAL FIELD

This invention relates to paper filter elements for use in manufacturing motor vehicle filters for use in filtering fluids associated with the operation of motor vehicle internal combustion engines, and in particular to paper filter elements formed primarily from paper made from cellulose fibers.

BACKGROUND

The use of pleated paper elements in both oil filters and in air filters on motor vehicle internal combustion engines to remove particulate materials is well-known, and the manufacture of filter paper of a porosity suitable for such elements has reached such a degree of excellence that filter paper is readily available commercially from which pleated paper elements can be produced having filtering efficiencies of at least 97% when tested using a standard fine test dust.

It is desirable, where possible, to produce pleated paper filter elements having as high a dust-holding capacity as possible without any appreciable loss in filtering efficiency occurring, since a high dust-holding capacity in a pleated paper filter element can materially improve the service life of that filter. This is particularly the situation with pleated paper filter elements for use in air filters.

The commercial manufacture of filter paper involves the production of a paper pulp from a source of cellulose and the subsequent deposition and dewatering of that pulp upon wire screens in order to obtain a coherent sheet of filter paper. In such a sheet of filter paper, the side of the paper which, during manufacture, was adjacent to the wire screens of the paper-making machine, and known as the "wire-side" of the paper, is more compacted than is the opposite side of the paper, and customarily is distinctively marked as such by the paper manufacturer, since the manufacture of pleated paper filter elements from such paper involves arranging for the wire-side of the paper to form the clean side of the filter element. The clean side of a filter element is the side at which the filtered fluid leaves the filter element. By careful control of the constituents of the paper pulp and the processing steps used, it is possible to obtain virtually any desired degree of overall porosity in the manufactured filter paper, but it is generally found that the higher the degree of porosity produced in the filter paper, the lower is the overall mechanical strength of the filter paper. Consequently, there is a limit on the degree of porosity available in filter paper produced from cellulose fibers and suitable for the manufacture of pleated paper filter elements.

Much work has recently been carried out, particularly by Japanese paper manufacturers, on the production of filter papers in order to produce a layered structure in the paper so that the structure contains one or more layers of different fibrous material in or adjacent the opposite side of the paper to the wire-side. Such layered structures are alleged to improve the dust-holding capacity of pleated paper filter elements manufactured from such filter papers. The production of such layered structures, however, necessarily complicates the production procedure, and involves the use of more expensive ingredients than those normally used in filter paper manufacture, so making the finished product substantially more expensive to use in the manufacture of pleated paper filter elements.

An alternative approach to a layered structure in the paper, used in the production of a disposable dust container from single ply filter paper for use in vacuum cleaners, is disclosed in GB-A-1,197,250. GB-A-1,197,250 discloses the concept of roughening one side of the filter paper in order to produce a layered structure in the paper comprising an inner thicket of fibers superimposed on the remaining thickness of the paper, the original unroughened paper having an initial thickness of around 0.2 mm., and the remaining thickness of the paper after roughening being less than 0.2 mm. The roughening procedure comprises the mechanical abrasion of one side of the single ply paper with, for example, rotating brushes, to wear away portions of the surface of said one side in order to create said inner thicket of fibers, and produces a disposable dust container formed from a single ply paper which displays an improved porosity compared to a similar dust container made from single ply unroughened filter paper. It appears clear from the disclosure made in GB-A-1,197,250 that the extent of the roughening procedure must be carefully controlled to ensure that the part of the paper which is not roughened is sufficiently strong for the bag to serve as a place for storage for collected dust during vacuum cleaning, and also when the bag is removed from the vacuum cleaner for disposal.

SUMMARY OF THE INVENTION

A pleated paper filter element according to the present invention comprises a pleated sheet of cured, resin-impregnated filter paper formed from cellulose fibers, in which a surface layer of the fibers present on the side of the sheet which is opposite to the wire-side (as hereinbefore defined) of the sheet is mechanically treated to form a textured surface layer in which the individual fibers are raised up and form a fluffy porous layer having a higher porosity than the remaining untreated layers in the sheet, said pleated paper filter element having an increased thickness and an increased dust-holding capacity compared to a similar pleated paper filter element formed from untreated, cured, resin-impregnated filter paper.

The mechanical treatment used to form the textured surface layer comprises the mechanical teasing of the surface layer of said opposite side of the filter paper to raise the individual fibers thereof, and to increase the overall thickness of the filter paper, after the filter paper is impregnated with an uncured synthetic resin and preferably before the filter paper is pleated and cured.

The preferred method of obtaining a pleated paper filter element according to the present invention comprises passing a standard, commercially-available resin-impregnated filter paper formed from cellulose fibers into a teasing device so that the side of said filter paper opposite the wire-side thereof comes into contact with one or more moving teasel-like, nap-forming surfaces within said teasing device; subjecting said opposite side to gentle mechanical teasing by said moving surfaces for a period of time sufficient to raise the fibers in said surface layer to a predetermined extent; removing said mechanically-teased filter paper from said teasing device; forming said mechanically-teased filter paper into a plurality of pleats; shaping said pleated, mechanically-teased filter paper into the pre-defined shape of the filter element, with said mechanically-teased surface layer positioned in the filter element to make initial contact, when the filter is in use, with the fluid to be filtered; forming resilient end seals on said shaped paper filter element; and then curing said shaped paper filter element at a pre-defined temperature. A suitable pre-defined temperature for curing the shaped paper filter element is 160° C., the element being exposed to such a curing temperature for a period of about 5 minutes.

These and other features and advantages of the invention will be more fully understood from the following description of certain specific embodiments of the invention taken together with the accompanying drawings.

BRIEF DRAWING DESCRIPTION

A preferred embodiment of the present invention and how it may be performed are hereinafter particularly described with reference to the accompanying drawings, in which.

Corresponding reference characters indicate corresponding parts throughout the several views of the drawings.

DETAILED DESCRIPTION

Figure 1:
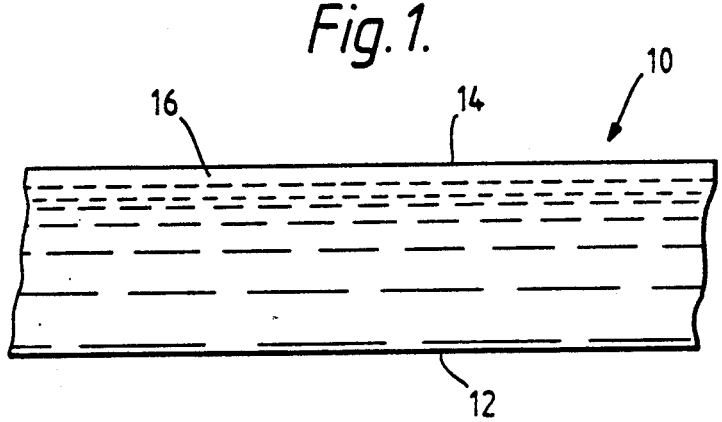
FIG. 1 shows a magnified, cross-sectional view of a portion of a sheet of a standard, commercially-available filter paper, impregnated with uncured resin.

As can be seen in FIG. 1 of the drawings, the starting material utilized for making a pleated paper filter element according to the present invention is a standard, commercially-available filter paper 10 having a lower, wire-side 12 which, when in use, constitutes the clean side of the filter element, and an upper, plane side 14, or opposite side with the porosity of the filter paper increasing from the wire-side 12 to the upper side 14. The filter paper as initially manufactured contains no filler or sizing, and is formed primarily from cellulose fibers having a maximum fiber length consistent with a fairly even formation of the paper, free from holes and weak spots. The thickness of the paper lies within the range of 550 to 750 micrometers and the paper weighs between 94 to 106 grams/square meter. The porosity of the un-impregnated filter paper is such that the pressure drop required across the filter paper to achieve an air flow of 20 meters/minute therethrough lies within the range of 58.84–127.49 Pa (6–13 mm water gauge).

Filter paper 10 is impregnated with a solution of a heat-curable phenolic resin dissolved in methanol, prior to delivery from the paper manufacturer. When such an impregnated filter paper is used to prepare a standard test filter element having a surface area of pleated paper amounting to 4816 square centimeters, that test element, after heating to cure the resin-impregnated paper thereof, has a dust-holding capacity of at least 0.0083 grams/square centimeter when filtering a test air flow of 4.2 cubic meters/minute containing a dust concentration of 353 milligrams/cubic meter. Such a test filter element displays a cumulative filtration efficiency of not less than 97%.

Filter paper 10 is treated to produce the filter paper according to the present invention by mechanically teasing the upper plane side 14 so as to raise the fibers present in a surface layer 16 of that side 14 to form a textured surface layer 18 (see FIG. 2) in which the individual fibers stand up from the upper surface of the filter paper 10, forming a fluffy porous layer. The mechanical teasing procedure is carried out by passing the filter paper into a teasing device in which the upper plane side 14 of the filter paper 10 comes into contact with moving nap-forming surfaces such as one or more moving belts carrying on the contact surfaces thereof a plurality of fixed, upstanding, teasel-like metal spikes, each of which is approximately 10 mm long. Each such spike extends upwards from the belt, and is bent through an angle of 45° at its mid-section to produce an angled free end approximately 5 mm long. During the passage of the filter paper 10 through the teasing device, the spikes on the moving belts gently tease the upper plane side 14 of the filter paper to form a fluffy layer of raised fibers on the upper plane side 14, similar to a layer of felt, without markedly decreasing the overall strength of the filter paper 10. The treated filter paper 10' thus obtained is shown in FIG. 2, wherein it can be seen that the upper side of the treated filter paper 10' is now formed by a porous, textured surface layer 18 of upstanding fibers, which surface layer increases the overall thickness of the treated filter paper up to about 50% of the thickness of the original filter paper.

Figure 2:
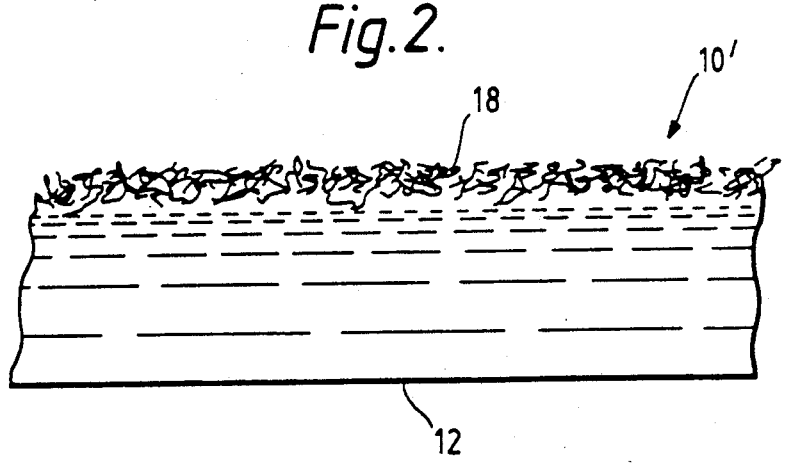
FIG. 2 shows a magnified, cross-sectional view of a portion of a sheet of said standard, resin-impregnated, commercially-available filter paper shown in FIG. 1, which has been mechanically treated to form the filter paper from which a pleated paper filter element according to the present invention is prepared.

The formation of the treated filter paper 10' shown in FIG. 2 from the standard filter paper 10 shown in FIG. 1 can be obtained by other mechanical teasing techniques and moving nap-forming surfaces, such as by the use of one or more moving belts carrying on the contact surfaces thereof a layer of abrasive material, such as carborundum, or by the use of rotary abrasive discs or by passing the filter paper beneath finely spiked rollers. The degree of teasing of the upper side of the filter paper is restricted to that necessary to raise the fibers in the filter paper that are immediately adjacent that upper side so as to form said porous, textured surface layer 18 of upstanding fibers to an overall thickness of 20–50% of the thickness of the original filter paper.

The treated filter paper 10' shown in FIG. 2 can be readily formed into a pleated paper filter element, followed by the heating of that element to cure the resin that is impregnated in the filter paper. This curing step does not affect the textured surface layer 18 of the filter paper to any extent except to slightly stiffen and strengthen the upstanding fibers that form that textured layer 18. It will be understood, of course, that such a formed, cured filter element will be utilized in the filter concerned so that the fluid to be filtered comes into contact initially with the textured layer 18 of the filter paper of the element. The fluid exits the filter element through the wire-side 12, or clean side. During filtration of the fluid, much of the solid particulate material present in the fluid is caught by, and retained by, the textured layer 18, and thus is effectively prevented from entering and clogging the pores in the filter paper underlying the textured layer 18.

Figure 3:
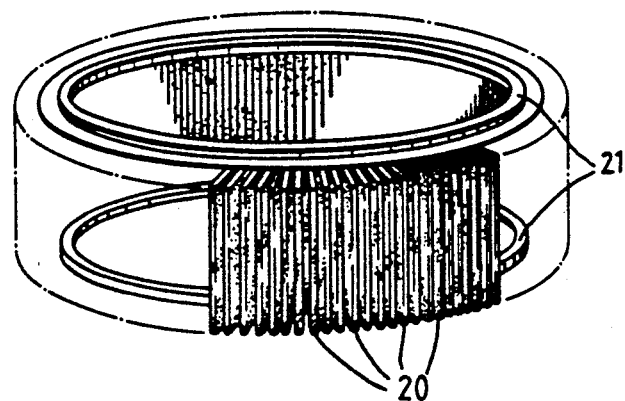
FIG. 3 shows a view of said pleated paper filter element according to the present invention.

When the treated filter paper shown in FIG. 2 is formed into a pleated paper filter element for use in an air cleaner, and the element thus formed is heated to cure the resin-impregnated paper, the resultant filter element has a predefined shape such as the configuration shown in FIG. 3, where the outer surface of each of the pleats 20 is formed from the textured surface layer 18 of the treated filter paper 10'. Resilient end seals 21 are formed on the upper and lower ends of the pleated paper filter element shown in FIG. 3.

Figure 4:
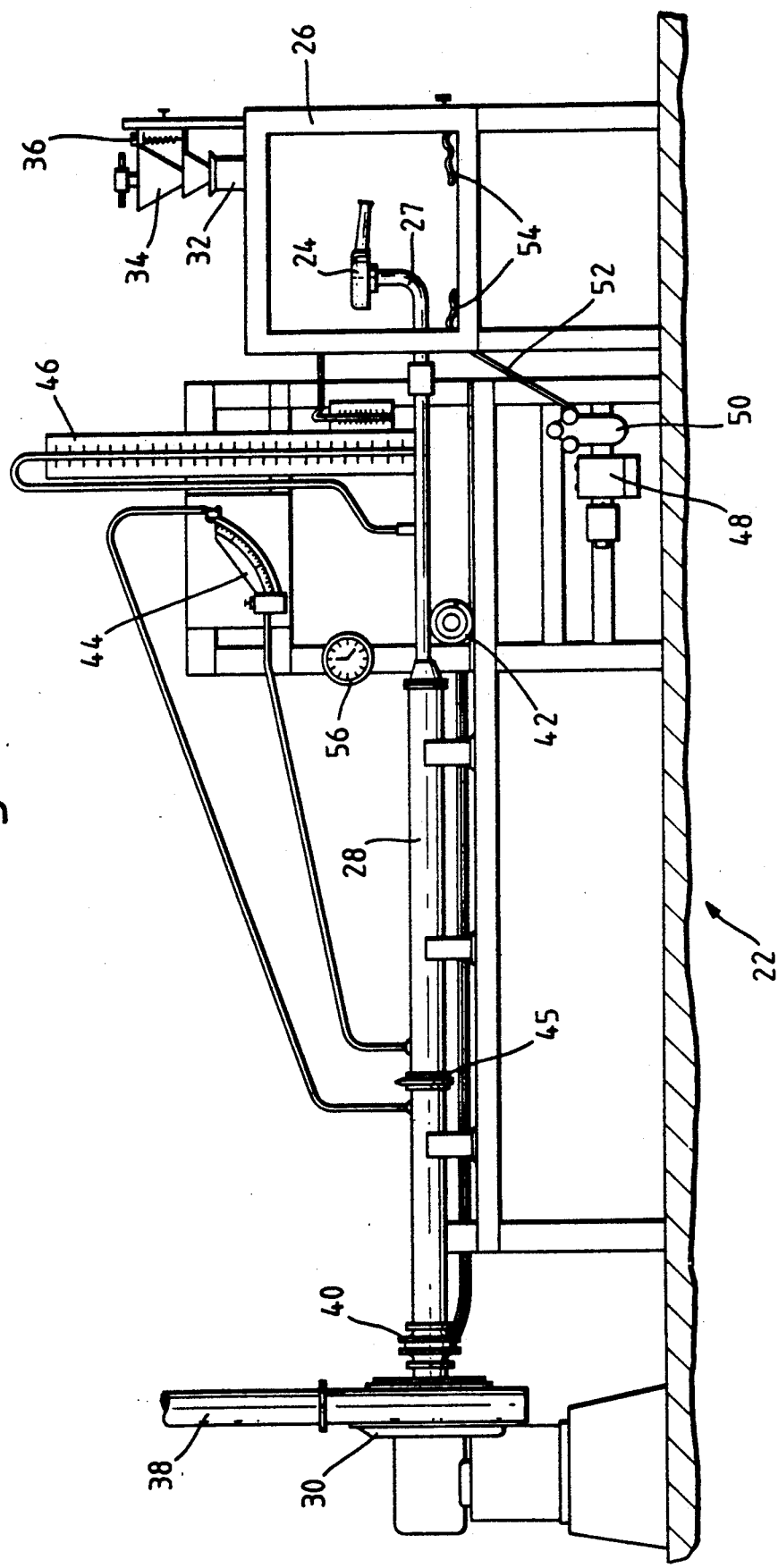
FIG. 4 shows a schematic lay-out of an air cleaner test rig for evaluating the dust-retaining capacity of a pleated paper filter element according to the present invention.

Tests were carried out on samples of air cleaner filter elements of the type shown in FIG. 3, manufactured from the treated filter paper 10' of the present invention and from the standard, commercially-available filter paper 10, using an air cleaner test rig apparatus 22 as shown in FIG. 4. The tests were carried out to determine the dust capacity and efficiency of each filter element sample at a constant rated air flow. Each filter element sample in turn was placed within an air cleaner housing 24 contained within a dust chamber 26. Air cleaner housing 24 was connected via a pipe 27 to a main extractor duct 28 leading to a rotary exhaust fan 30. Air was fed to the dust chamber 26 through an annular inlet 32 surrounding a vibratory dust feed apparatus 34 which was maintained in vibration during testing by means of an electrical vibrator 36, so as to evenly distribute test dust from the dust feed apparatus 34 into the inlet air entering the dust chamber 26. Operation of the exhaust fan 30 drew the dust-laden air in the dust chamber 26 into the air cleaner housing 24 and through the filter element sample under test, the filtered air passing along pipe 27, through extractor duct 28 and exhaust fan 30 and exiting to outside atmosphere through exhaust duct 38. The rate of flow of air through the filter element sample under test was governed by a throttle valve 40 in the extractor duct 28, which was controlled with a throttle control 42. The rate of air flow was monitored using an air flow meter 44 coupled to the extractor duct 28 on either side of an orifice plate 45. A water gauge 46 for recording the pressure drop across the filter element sample under test in the air cleaner housing 24 was connected to pipe 27 at a point at least six pipe diameters downstream of the outlet from the air cleaner housing 24. It was important to ensure that the test dust used was maintained in suspension in the dust chamber 26 throughout each test, and this was done by means of compressed air, which was generated by a compressor 48 and passed through an air filter and regulator 50 and a feed pipe 52 into compressed air agitator tubes 54 adjacent the floor of the dust chamber 26.

The test procedure used for each filter element sample under test comprised first weighing the filter element sample to be tested, prior to its installation in the air cleaner housing 24, and then charging the dust feed apparatus 34 with a weighed amount of standard AC Fine Test Dust (ACFTD). AC Fine Test Dust is a naturally occurring Arizona dust having a particle size distribution ranging from 0 to 80 micrometers in diameter, which is available commercially from AC Rochester Division, General Motors Corporation, Flint, Mich., U.S.A. Each test was conducted at a constant air flow rate, using a dust concentration of 350 mg/m³ in the air in the dust chamber 26. The pressure drop across the filter element sample under test was recorded every 15 minutes, using the clock 56, and the test continued until that pressure drop registered 1471 Pa (150 mm. w.g.). At the end of each test, the filter element sample under test was removed from the dust chamber and was re-weighed, and any dust remaining in the dust feed system was collected and weighed.

The dust capacity (DC) of the filter element sample under test is expressed in grams and is equal to the exact amount of dust delivered to the filter element sample under test, i.e., $$DC = DF - DR,$$

where
DC=dust capacity in grams,
DF=dust in grams charged in dust feed apparatus, and
DR=dust in grams remaining in feed system and the dust chamber at end of test.

The efficiency of the filter element sample under test is expressed as a percentage, and is obtained as follows:

$$\% = \frac{MA - MB}{DC} \times 100$$

where
%=efficiency of the filter element sample under test,
MB=mass of the filter element sample before test, in grams,
MA=mass of the filter element sample after test, in grams, and
DC=dust capacity of the filter element sample under test, in grams.

The above test procedure was carried out on samples of three different filter elements, shown as filter elements A, B and C in the table below, where filter element A was formed from a standard, commercially-available filter paper, and filter elements B and C were formed according to the present invention, using the same standard, commercially-available filter paper as the starting material and varying the extent of mechanical teasing of the filter paper surface to produce a different thickness of the textured layer in filter element B compared with filter element C. The table also shows, for comparison, the values set for a standard pleated paper filter element in respect of dust load (equivalent to the mass of dust retained by the filter element), efficiency and dust/unit area, when subjected to the same test.

TABLE

| Test Parameter | Units | A | B | C | Standard |
| --- | --- | --- | --- | --- | --- |
| Test Flow Rate | m³/min | 4.2 | 4.2 | 4.2 | 4.2 |
| Test Dust | | ACFTD | ACFTD | ACFTD | ACFTD |
| Dust Conc. | mg/m³ | 350 | 350 | 350 | 350 |
| P.D. Build-up | mm WG | 150 | 150 | 150 | 150 |
| Dust Load | g | 49.2 | 61.98 | 85.35 | 40.00 |
| Efficiency | % | 98.3 | 98.3 | 98.4 | 97.0 |
| Dust/Unit Area | g/cm² | 0.0094 | 0.0118 | 0.0162 | 0.0083 |

It is clear from the results obtained in these tests that pleated paper filter elements according to the present invention have a much higher dust-holding capacity (equivalent to the dust load) than pleated paper filter elements formed from untreated filter paper of the same type, without displaying any decrease in overall efficiency of the pleated paper filter elements. It should also be noted that all of the pleated paper filter element samples of type A, B and C tested displayed filtration characteristics which exceeded the filtration requirements set for standard pleated paper filter elements.

These results indicate that the dust-holding capacities (equivalent to the dust load) of pleated paper filter elements according to the present invention are up to 73.5% greater than the dust-holding capacity of a substantially identical unit formed from the standard, commercially-available filter paper shown in FIG. 1, without loss in efficiency. The increase in dust holding capacity of pleated paper filter elements of the present invention is expressed as a percentage, and is obtained as follows:

$$\% = \left( \frac{\text{Dust Holding Capacity (invention)}}{\text{Dust Holding Capacity (standard)}} \times 100 \right) - 100$$

where
%=increase in dust holding capacity of a pleated paper filter element of the present invention (e.g., filter element B or C),
Dust Holding Capacity (invention)=dust holding capacity of a pleated paper filter element of the present invention (e.g., filter element B or C), and
Dust Holding Capacity (standard) dust holding capacity of a pleated paper filter element formed from a standard, commercially available filter paper (e.g., filter element A). Moreover, this increase in the dust-holding capacity is achieved without markedly decreasing the mechanical strength of the filter element and without materially affecting the overall porosity of the element. Thus, for example, in respect of the filter element C listed in the table, a test sample of the paper, after texturing and curing, had a total thickness of 927 micrometers, displayed a tensile strength of 76.8 N/15 mm, and exhibited an air resistance of 8.5 mm. WG when subjected to an air flow rate of 20 liters/minute in a standard Evans Adlard tester (the Evans Adlard tester enables a sample of the paper filter element to be supported across an orifice and the pressure drop across the sample to be measured when the sample is subjected to a controlled air flow). A similar test sample of the paper used in respect of filter element A listed in the table had a thickness of 650 micrometers after curing, displayed a tensile strength of 83.8 N/15 mm, and also exhibited an air resistance of 8.5 mm WG when subjected to the same air flow rate in the standard Evans Adlard tester. The filtration efficiency of such a pleated paper air filter element according to the present invention lies above the value of 97.0% set for standard pleated paper filter elements.

Thus the pleated paper filter element of the present invention can be readily and inexpensively formed from standard, commercially available filter paper, and provides a pleated paper filter element which resists clogging to a greater extent than a like pleated paper filter element made from said standard filter paper, and which exhibits a higher dust-holding capacity (equivalent to the dust load), and thus service life, over said like elements.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The embodiments of the invention in which an exclusive property or privilege is claimed are defined as follows:

1. A pleated paper filter element comprising
a one-piece sheet of filter paper formed by depositing on a wire screen a solution including cellulose fibers and water, dewatering said fibers on the wire screen causing said fibers to bind together, and removing said dewatered fibers from the wire screen wherein said dewatered fibers constitute said sheet of filter paper, and
wherein the surface of said sheet which adjoined the wire screen constitutes a wire-side, said wire-side being more compact that the other portions of said sheet, said wire-side constituting a clean side of said sheet,
said sheet being impregnated with a heat-curable phenolic resin,
the surface of said sheet having a textured surface layer opposite said wire-side, said fibers in said textured surface layer standing up away from the adjoining portion of said sheet to form a fluffy porous layer, said fibers in said textured surface layer being entangled with said fibers in the adjoining portion of said sheet to retain said textured surface layer thereto,
said sheet being pleated,
said textured surface layer being cured to increase the stiffness and strength of said fibers therein so that,
when said pleated sheet is disposed in a fluid flow containing solid particulate material wherein the fluid enters said sheet through said textured surface layer and exits said sheet through said clean side, a portion of the solid particulate material becomes lodged in said textured surface layer.

2. A pleated paper filter element according to claim 1 in which the surface layer of said sheet opposite said wire-side is mechanically teased to form said textured surface layer and said textured surface layer has an overall thickness which is 20-50% of the original thickness of said sheet prior to said mechanical teasing taking place.

3. A pleated paper filter element according to claim 2, in which the original thickness of the filter paper prior to the mechanical treatment taking place is within the range of approximately 550 to 750 micrometers.

4. A method of making a pleated paper filter element comprising:
depositing on a wire screen a solution including cellulose fibers and water;
dewatering the fibers on the wire screen causing the fibers to bind together;
removing the dewatered fibers from the wire screen wherein the dewatered fibers constitute a one-piece sheet of filter paper, and wherein the surface of the sheet which adjoined the wire screen constitutes a wire-side which is more compact that the other portions of the sheet, the wire-side constituting a clean side of the sheet, the surface of the sheet opposite the wire-side constituting an opposite side;
impregnating the sheet with a heat-curable phenolic resin;
inserting the sheet into a teasing device containing a moving nap-forming surface so that the opposite side comes into contact with the nap-forming surface resulting in the opposite side being subjected to gentle mechanical teasing by the nap-forming surface for a period of time sufficient to raise the fibers to a predetermined extent, thee raised fibers constituting a textured surface layer, the fibers in textured surface layer being entangled in the adjoining portion of the sheet to retain the textured surface layer thereto;
removing the sheet from the teasing device;
forming the sheet into a plurality of pleats;
shaping the pleated sheet into a predefined shape so that, when the shaped sheet is disposed in a fluid flow, the fluid enters the shaped sheet through the textured surface layer and exits the shaped sheet through the clean side; and
curing the shaped sheet at predefined temperature.

* * * * *